(12) United States Patent
Hwang

(10) Patent No.: US 6,891,582 B2
(45) Date of Patent: May 10, 2005

(54) MOLD FRAME STRUCTURE OF LIQUID CRYSTAL DISPLAY

(75) Inventor: Yun Ho Hwang, Gumi-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 33 days.

(21) Appl. No.: 10/607,241

(22) Filed: Jun. 27, 2003

(65) Prior Publication Data

US 2004/0041960 A1 Mar. 4, 2004

(30) Foreign Application Priority Data

Sep. 3, 2002 (KR) .............................. 10-2002-0052988

(51) Int. Cl.[7] ...................... G02F 1/1333; G02F 1/1345
(52) U.S. Cl. ...................... 349/58; 349/149; 349/150
(58) Field of Search ............................ 349/58, 149–152

(56) References Cited

U.S. PATENT DOCUMENTS

| | | | |
|---|---|---|---|
| 6,473,146 B1 * | 10/2002 | Lee ............................ | 349/152 |
| 6,583,831 B2 * | 6/2003 | Kim ............................ | 349/58 |
| 6,587,166 B1 * | 7/2003 | Lee et al. ...................... | 349/58 |
| 6,587,355 B2 * | 7/2003 | Park et al. .................... | 361/799 |
| 6,667,780 B2 * | 12/2003 | Cho ............................ | 349/58 |

FOREIGN PATENT DOCUMENTS

KR      10-1998-079788      11/1998

* cited by examiner

*Primary Examiner*—Tarifur R. Chowdhury
(74) *Attorney, Agent, or Firm*—McKenna Long & Aldridge LLP

(57) ABSTRACT

Disclosed is a mold frame structure of an LCD including a main frame, a plurality of connection plate coupling parts corresponding to PCBs attached to the rear side of the main frame, wherein the connection plate coupling parts are integral to the main frame along edges of the main frame, and a plurality of ground connection plates coupled to the plurality of connection plate coupling parts, for grounding ground terminals of the PCBs to the upper case.

21 Claims, 6 Drawing Sheets

MOLD FRAME STRUCTURE OF LIQUID CRYSTAL DISPLAY

This application claims the benefit of Korean Patent Application No. 2002-52988, filed on Sep. 3, 2002, which is hereby incorporated by reference for all purposes as if fully set forth herein.

BACKGROUND OF THE INVENTION

1. Field of the Invention

The present invention relates to a liquid crystal display (LCD), and more particularly, to a mold frame structure of an LCD in which a main frame accommodating an LCD panel and an optical sheet is slim and lightweight and a ground terminal of a PCB attached to the rear side of the main frame is stably grounded.

2. Description of the Related Art

Recently, as technology in the semiconductor industries rapidly develops, slim and lightweight liquid crystal displays (LCDs) having improved performance are produced. Up to now, cathode ray tubes (CRTs) widely used as information display devices have many advantages in view of performance or price. However, CRTs have many disadvantages regarding miniaturization or portability.

On the contrary, LCDs have advantages such as miniaturization, light weight and low power consumption, so that LCDs have gradually attracted attention as an alternative display that can overcome the disadvantages of CRTs. Today, LCDs are actually employed in almost all information processing equipment that require display devices.

In an LCD, a voltage is applied to modify a specific molecular alignment of liquid crystal into another molecular alignment that either blocks or passes light.

Recently, in order to provide competitive products, several slim and lightweight structures have been developed. One of them is a mold frame structure for an LCD. In the mold frame structure of the LCD, optical units, i.e., backlight units are stacked on a display panel including an array substrate and a color filter substrate attached to each other, and accommodated in a main frame so as to protect the resultant structure. Then, a top case and a bottom case are combined with each other.

A printed circuit board (PCB), providing signals to a gate pad and a data pad that are formed at edges of the display panel, is connected to a flexible cable by a taped carrier package (TCP) on which a drive IC is mounted.

FIG. 1 is a perspective view of a general liquid crystal display including elements for a mold frame. An LCD display panel 5 includes an array substrate and a color filter substrate attached to each other. The array substrate has a plurality of pixels formed in a matrix, and the color filter substrate has R, G and B color filters formed in a matrix. A backlight unit is stacked on the LCD display panel. The resultant structure including the LCD display panel and the backlight unit is accommodated in a main frame.

A gate PCB 7, formed at one edge of the display panel 5 to apply a drive signal, is connected to the gate pad of the display panel 5 through a flexible cable, spaced apart from the gate TCP 6a.

The gate TCP 6a includes a gate drive IC that is arranged in the middle of the flexible cable and controls the drive signal to be applied to the display panel 5 according to a predetermined scan method.

Similarly, a data PCB 9, formed at another edge of the display panel 5 to apply a graphic signal, is connected to the data pad of the display panel 5 through a flexible cable. The data PCB 9 includes a data TCP 6b for applying a signal to the display panel 5 according to a predetermined scan method.

A backlight unit 10 is attached in a stack structure at the back of the display panel 5. The backlight unit 10 includes a plurality of optical sheets 11, a backlight 13 for generating light, a light guide plate 15 for changing the light generated from the backlight into a planar light over the area of the display panel 5, and a reflective plate 17 for reflecting light leaked from the light guide plate 15 to enhance light efficiency.

The backlight unit 10 and the display panel 5 are accommodated in the main frame 21 in a stack structure so as to protect them from an external impact and optically align them. In order to prevent movement of the display panel 5, a panel guide 3 is attached to fix the display panel 5.

The main frame 21 can be made of metal or plastic materials. The display panel 5 and the backlight unit 10 are accommodated in the main frame 21 in a stacked structure and then the panel guide 3 is combined with the main frame 21.

Thereafter, the top case 1 and the bottom case are combined with the main frame 21 accommodating the display panel 5 and the backlight unit 10. With a recent trend to make the LCD thinner, only the top case 1 is combined.

In order to resolve a grounding problem of the gate and data PCBs 7 and 9 folded on a rear side of the main frame 21 by removing the bottom case as described above, a cover plate is attached to the main frame 21 and electrically connected to the PCBs 7 and 9.

FIG. 2 is a plan view of a mold frame of a general liquid crystal display. The display panel and the backlight unit are accommodated in the main frame 21, and the top case is combined with the main frame 21.

The cover plate 23 is attached to the rear side of the main frame 21, and the pad region of the display panel accommodated in the main frame 21, and the PCB (not shown) connected through the TCP are folded on the rear side of the main frame 21.

Additionally, a shield cover 25 covering the PCB is attached providing for electromagnetic interface (EMI) shielding and grounding.

Accordingly, the cover plate 23 attached to the rear side of the main frame 21, the PCB, and the shield cover 25 are arranged in an overlapped form. Screws 26 penetrating an upper end of the shield portion 25 are connected to ground the ground terminals of the PCBs 7 and 9 and the cover plate 23.

The shield cover 25 is attached to cover the PCB by the penetrating screws 26, and the ground terminals of the PCBs arranged between the shield cover 25 and the cover plate 23 are electrically connected to the cover plate 25.

Undesired reference numerals 22a and 22b of FIGS. 1 and 2 represent backlight connectors.

FIG. 3 is a sectional view taken along the line I-I' of FIG. 2. As shown, the cover plate 23 is attached to the rear side of the main frame (21 in FIG. 2) in order to ground the ground terminals of the PCBs 7 and 9. Additionally, the PCBs 7 and 9 are arranged between the cover plate 23 and the shield cover 25 for shielding the electro-magnetic interface (EMI) generated from the PCBs 7 and 9.

The screws 26 penetrate the shield cover 25 and the PCBs 7 and 9 so as to connect the ground terminals of the PCBs 7 and 9 to the cover plate 23 attached to the rear side of the main frame 21.

The shield cover 25 is used to prevent signals from being distorted due to any external electromagnetic waves and to prevent other modules contained in the LCD from being influenced by electromagnetic waves generated from the PCBs 7 and 9.

However, according to the mold frame of the LCD constructed as described above, the cover plate acting as a ground plate is attached to provide a separate ground of the PCB on the rear side of the main frame, resulting in increased thickness and weight.

Further, the additional process of attaching the cover plate for grounding the ground terminals of the PCBs increases the manufacturing cost and degrades the production efficiency.

SUMMARY OF THE INVENTION

Accordingly, the present invention is directed to a mold frame structure of an LCD that substantially obviates one or more problems due to limitations and disadvantages of the related art.

An advantage of the present invention is to provide a mold frame structure of an LCD in which a main frame accommodating a display panel is made in a slim and lightweight structure and ground terminal of PCBs attached to the rear side of the main frame are stably grounded to keep up with the slimness and the lightness of the LCD.

Additional features and of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, there is provided, an LCD mold frame assembly including a main frame, a plurality of connection plate coupling parts corresponding to PCBs attached to the rear side of the main frame, wherein the connection plate coupling parts are integral to the main frame along edges of the main frame, and a plurality of ground connection plates coupled to the plurality of connection plate coupling parts, for grounding ground terminals of the PCBs to the upper case.

In another aspect of the present invention an LCD display includes a display panel, a mold frame assembly comprising a main frame, a plurality of connection plate coupling parts corresponding to PCBs attached to the rear side of the main frame, wherein the connection plate coupling parts are integral to the main frame along edges of the main frame, and a plurality of ground connection plates coupled to the plurality of connection plate coupling parts, for grounding ground terminals of the PCBs to the upper case, a backlight unit stacked with the display panel in the main frame, a panel guide frame coupled with the main frame, and a top case coupled with the main frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
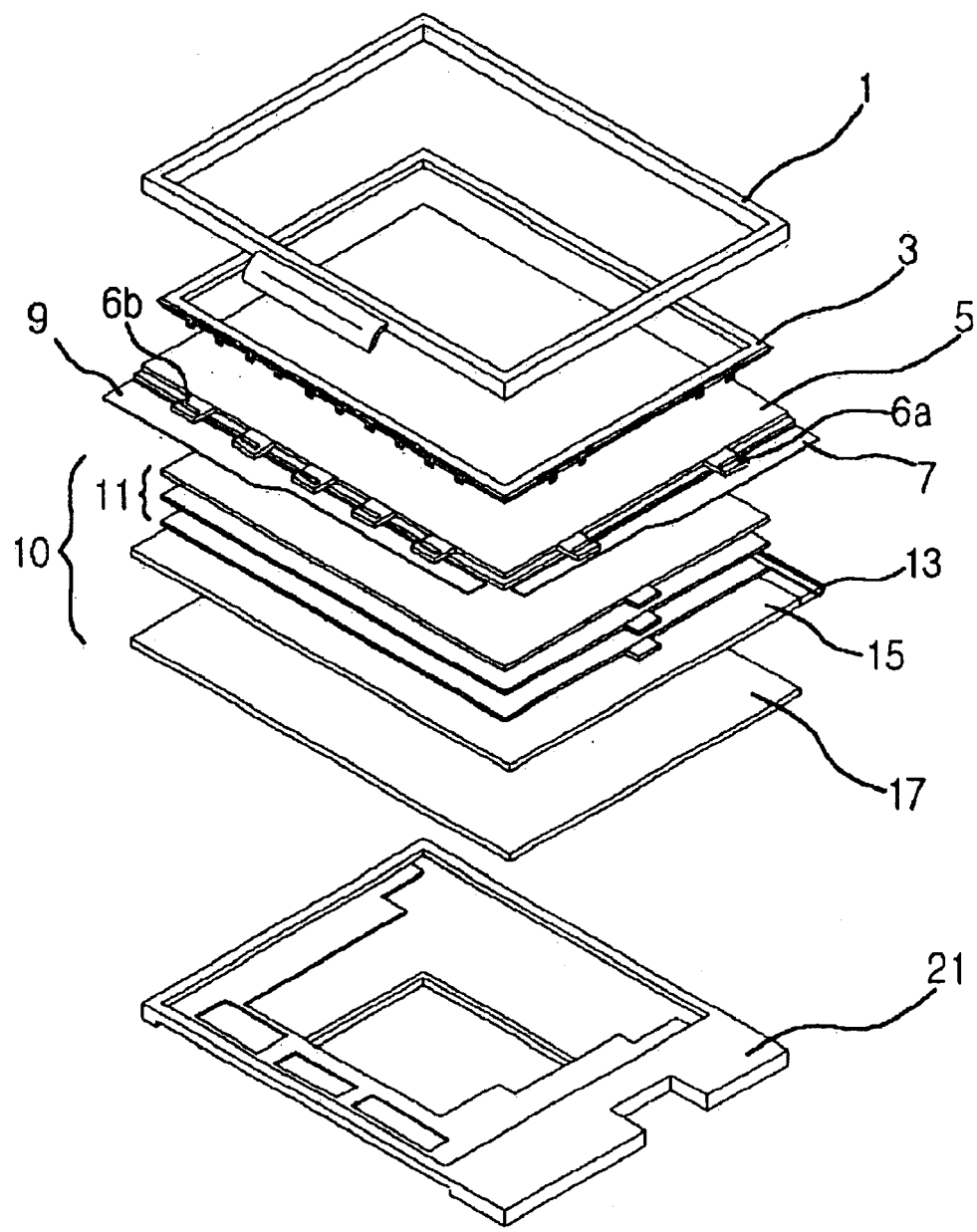
FIG. 1 is a perspective view of a general liquid crystal display including elements for a mold frame.
Figure 2:
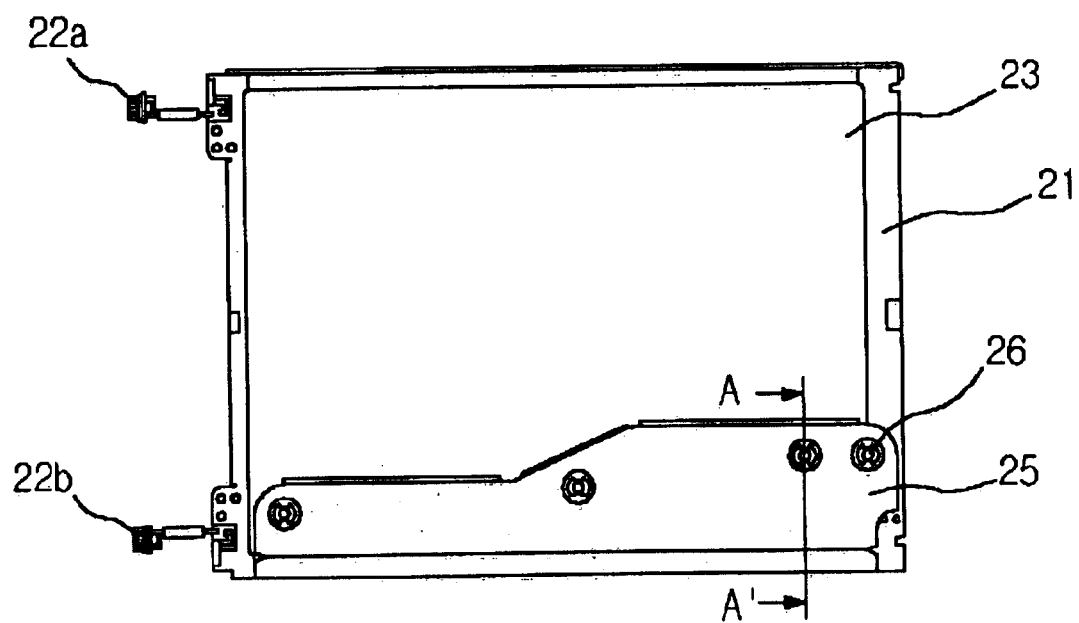
FIG. 2 is a plan view of a mold frame of a general liquid crystal display.
Figure 3:
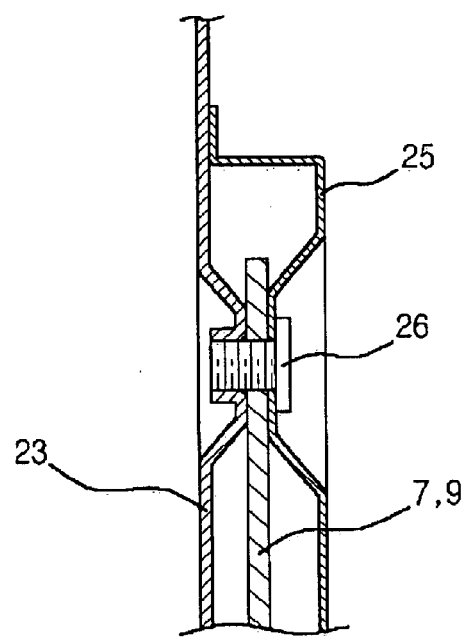
FIG. 3 is a sectional view taken along the line I–I' of FIG. 2.
Figure 4:
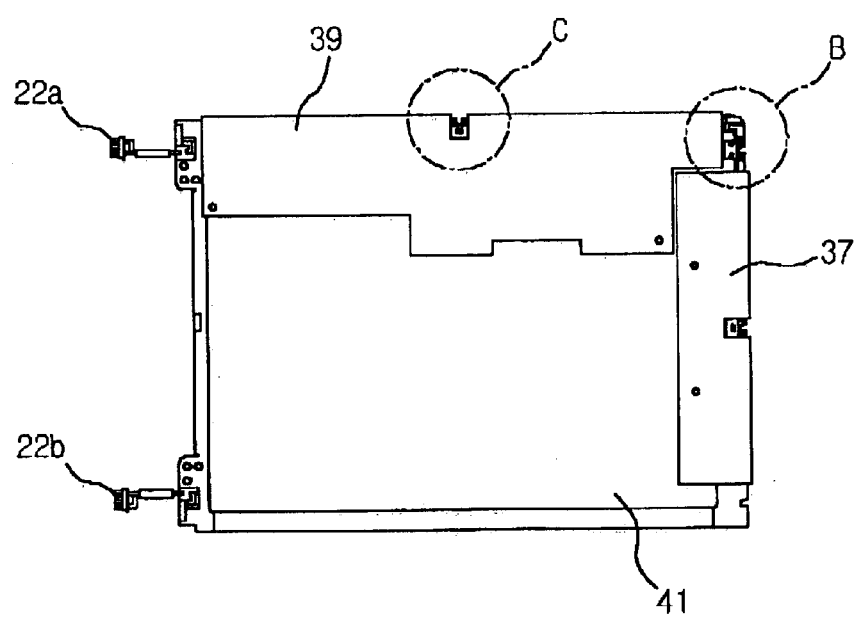
FIG. 4 is a plan view of a mold frame of a liquid crystal display according to the present invention.

FIG. 4 is a plan view of a mold frame of a liquid crystal display according to the present invention. A liquid crystal display panel, and a backlight unit including a plurality of optical sheets are accommodated in a stack structure in a main frame 41. The main frame 41 is coupled with a panel guide (not shown) such that the LCD panel is not moved. A top case (not shown) of metal is also coupled with the main frame 41 so as to protect the elements accommodated in the main frame 41 from an external impact.

Connectors 22a and 22b for supplying power to the backlight extend from both edges of the main frame 41. Although not shown in the drawings, a gate PCB 37 or a data PCB 39 is folded on the rear side of the main frame 41. A plastic transparent shield cover is attached on the PCBs 37 and 39.

In particular, in case of the present invention, the main frame 41 accommodating the LCD panel and the optical sheets are not provided at the rear side with lower case and cover plate for grounding. Only the shield cover is attached to the rear side of the main frame 41 so as to protect the PCBs 37 and 39.

Because the cover plate for grounding of the PCBs is not attached, the LCD is slimmer on whole. However, for stable operation of the PCBs 37 and 39, the PCBs 37 and 39 should be grounded.

For this purpose, in the invention, a plurality of connection plate coupling parts B, C are formed integrally with the main frame 41 along edges of the rear side of the main frame 41 where the PCBs 37 and 39 are arranged.

Although not shown in the drawings, the metallic top case is coupled with the upper surface of the main frame 41 and a ground connection plate for connecting the top case with the ground terminals of the PCBs 37 and 39 is attached to the connection plate coupling parts B, C formed in the edges of the main frame 41.

Thus, the top case is connected with the ground terminals of the PCBs 37 and 39 without attaching a separate cover plate for grounding the ground terminals of the PCBs 37 and 39 to the rear side of the PCBs, so that the PCBs 37 and 39 are stably grounded without a separate element and process.

Figure 5A:
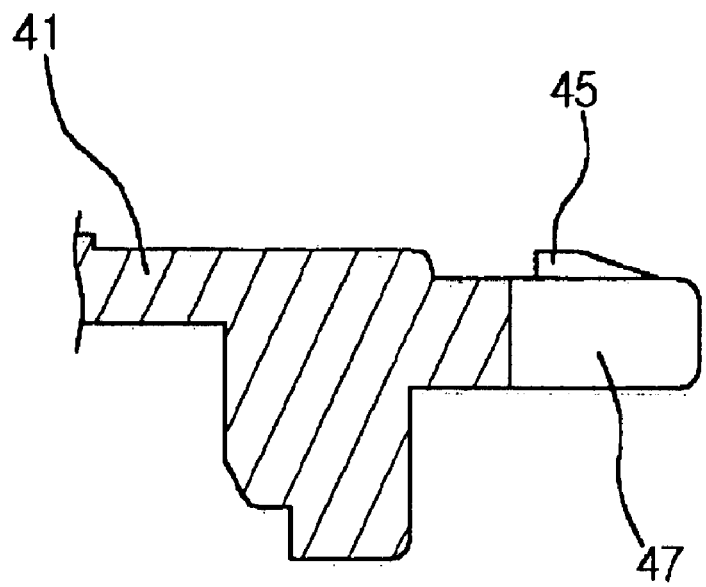
FIGS. 5A and 5B are schematic views illustrating a ground connection plate coupled to a main frame according to the present invention.
Figure 5B:
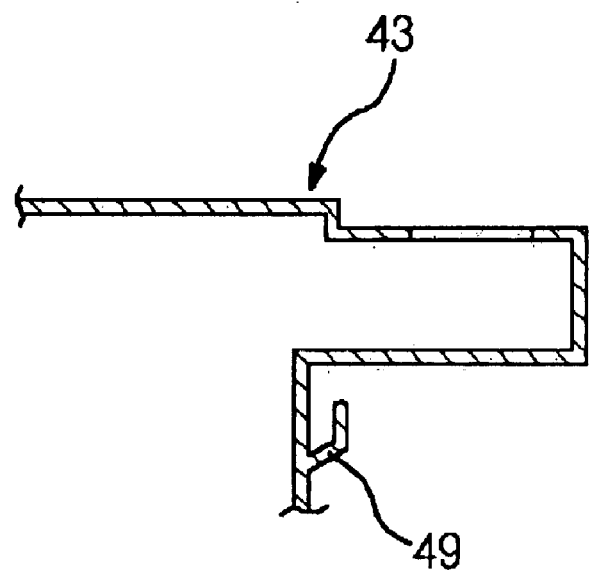

FIGS. 5A and 5B are schematic views illustrating that a ground connection plate is coupled to a main frame according to the present invention. At a predetermined region of the main frame 41, i.e., an edge where the PCBs are arranged or an edge of a region where the PCBs are crossed, a connection plate coupling part 47 protrudes from and is formed integrally with the main frame 41 so that the ground connection plate 43 is coupled with the connection plate coupling part 47.

The connection plate coupling part 47 is configured to have a fixing hook 45 on an upper surface thereof such that the fixing hook is fixed to a latch jaw (not shown in the drawings).

The ground connection plate 43 is made of a metallic plate in the shape that is the same as the connection plate coupling part 47 so that the ground connection plate 43 may be coupled with the connection plate coupling part 47 formed integrally with the main frame. At a lower portion of the ground connection plate 43, a case ground portion 49 is formed along an outer edge of the main frame 41 to be connected with the top case.

Accordingly, a backlight unit including a plurality of optical sheets and an LCD panel are accommodated in the main frame 41 and are first fixed by a panel guide. The PCBs connected with the LCD panel are folded and attached to the rear side of the main frame 41. After that, the top case is coupled with the main frame 41 so as to protect the main frame 41 from an external impact. The top case is grounded with the ground terminals of the PCBs attached to the rear side of the main frame 41 by the ground connection plate 43. Also, the ground connection plate 43 is coupled with the connection plate coupling part 47 of the main frame 41 such that the latch jaw formed at both edges of the ground connection plate 43 is latched onto the fixing hook 45. Hence, the ground connection plate 43 is firmly coupled with the main frame 41.

Figure 6:
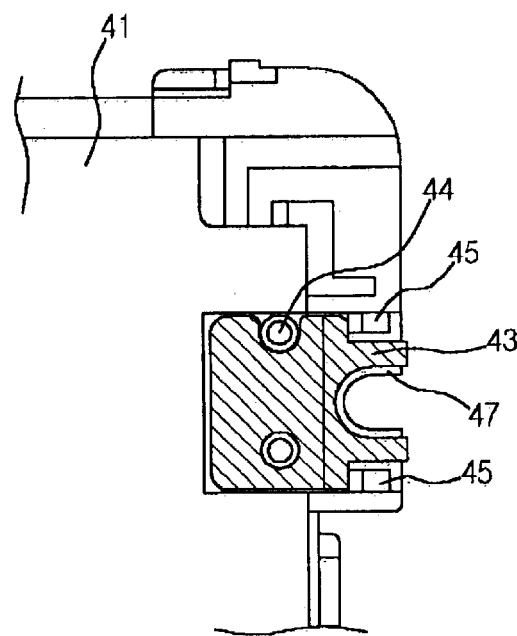
FIG. 6 is an enlarged plan view of the region 'B' of FIG. 4.

FIG. 6 is an enlarged plan view of the region 'B' of FIG. 4. The ground connection plate 43 is coupled with the connection plate coupling part 47 of the main frame 41 when the PCBs and the shield cover are not yet arranged on the rear side of the main frame 41. Thereby, the ground terminals of the PCBs to be folded to the rear side of the main frame 41 are connected with the ground connection plate 43 to be grounded to the top case. The region 'B' of the rear side of the main frame 41 is a region where the gate PCB and the data PCB are crossed. Hence, the two ground terminals of the gate PCB and the data PCB are grounded to the top case by the single ground connection plate 43.

On the connection plate coupling part 47 of the main frame 41, two coupling grooves 44 are formed to correspond to the two ground terminals of the PCBs. Also, on the ground connection plate 43, coupling holes are formed to correspond to the coupling grooves 44 formed on the main frame 41.

One of the coupling holes formed on the ground connection plate 43 is made in the form of a complete circle, and the other is made in the from of a groove at one edge of the ground connection plate 43. This is to provide a positional margin when aligning the coupling grooves 44 formed in the main frame 41 with the PCB ground terminals. Thus, for the positional margin, the two coupling holes may be formed in the form of a groove at an adjacent location to the edge on the ground connection plate 43, or in the form of a complete circle.

When the coupling holes having the groove form are formed on the ground connection plate 43 and when the PCB ground terminals are coupled by a screw, a good connection margin is secured. On the other hand, when the coupling holes having the complete circle form are formed on the ground connection plate 43, the ground terminals may be coupled and firmly fixed by a screw.

The latch jaw (not shown) formed at the edge of the ground connection plate 43 is latched onto the fixing hook 45 formed on the main frame 41 such that the coupled ground connection plate 43 may not easily escape from the connection plate coupling part 47 because of an impact or vibration.

Although not shown in the drawings, the ground connection plate 43 is configured to be connected with the top case and coupled with the front side of the main frame 41 along the edge of the main frame 41.

Figure 7:
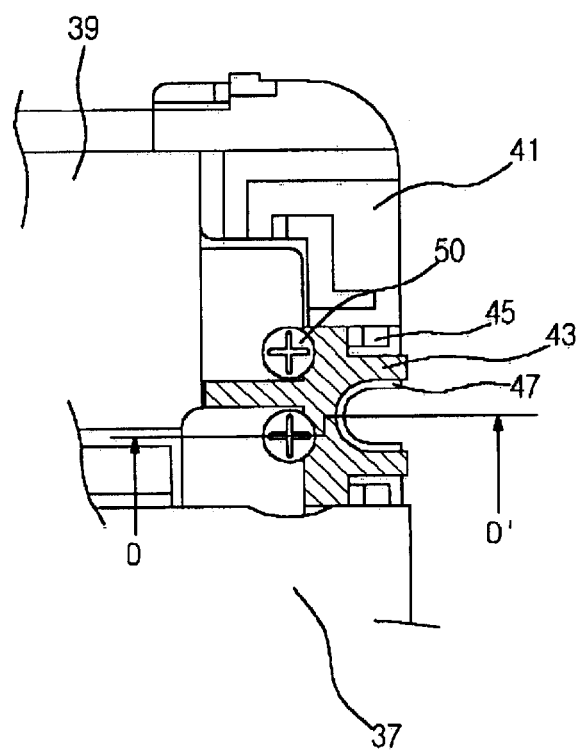
FIG. 7 is a schematic view illustrating a ground terminal of a PCB coupled to a main frame case in a liquid crystal display according to the present invention.

FIG. 7 is a schematic view illustrating a ground terminal of a PCB connected to a main frame case in a liquid crystal display according to the present invention. As the ground connection plate 43 is coupled with the connection plate coupling part 47 of the main frame 41, the coupling holes formed on the ground connection plate 43 are aligned with the coupling grooves formed on the rear side of the main frame 41.

Thereafter, the ground terminals of the PCBs 37 and 39 that are connected with the LCD panel by a flexible cable (not shown) and folded to the rear side of the main frame 41 are aligned with the coupling holes of the ground connection plate 43, and then the ground terminals of the PCBs 37 and 39 and the ground connection plate 43 are electrically grounded by a screw 50.

Also, although not shown in the drawing, when the ground connection plate 43 is coupled with the connection plate coupling part 47 of the main frame 41, a case ground part formed at an edge of the ground connection plate 43 is contacted with the top case, so that the ground terminals of the PCBs 37 and 39 are grounded to the top case via the ground connection plate 43.

Figure 8:
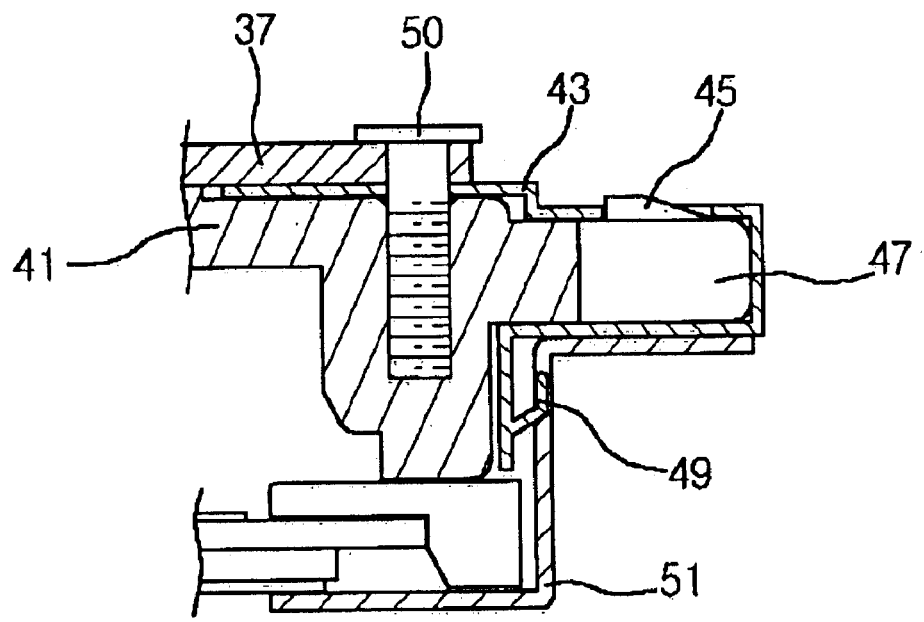
FIG. 8 is a sectional view taken along the line II–II' of FIG. 7.

FIG. 8 is a sectional view taken along the line II–II' of FIG. 7. At the edge where the PCBs 37 and 39 arranged on the rear side of the main frame are crossed, the ground connection plate 43 is coupled with the connection plate coupling part 47 formed integrally with the main frame 41.

The fixing hook 45 formed on the connection plate coupling part 47 is coupled with the latch jaw formed at the edge of the ground connection plate 43 such that it is not easily separated from the main frame 41 because of an impact or vibration.

The coupling grooves formed on the main frame 41, the coupling holes formed on the ground connection plate 43, and the ground terminal of the PCB 37 are aligned with one another, and then a metallic screw is inserted into the aligned coupling grooves and the coupling holes to electrically connect the ground terminal of the PCB 37 with the ground connection plate 43.

The case ground part 49 formed at the lower side of the ground connection plate 43 is electrically contacted with the top case 51 coupled to the front side of the main frame 41. Accordingly, the ground terminal of the PCB 37 arranged on the rear side of the main frame 41 is connected integrally with the ground connection plate 43 so as to stably ground the PCB 37.

Figure 9:
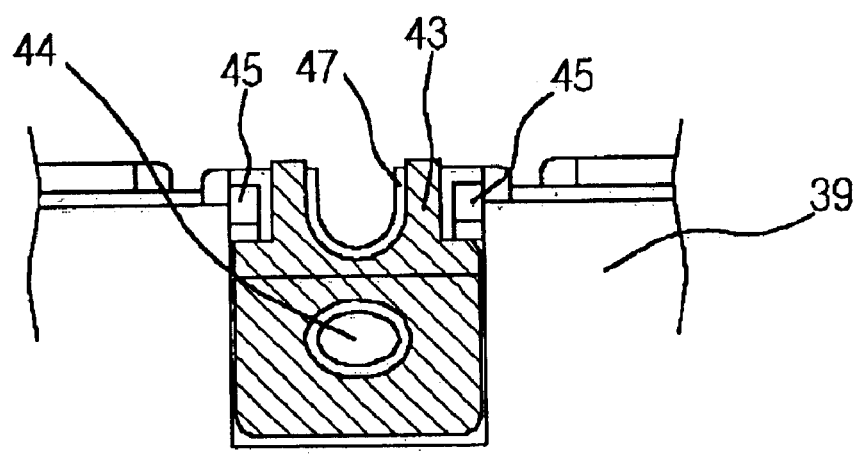
FIG. 9 is an enlarged plan view of the region 'C' of FIG. 4.

FIG. 9 is an enlarged plan view of the region 'C' of FIG. 4. The ground connection plate 43 is coupled with the connection plate coupling part 47 formed on the edge of the main frame 41 and the coupling hole formed in the ground connection plate 43 is connected with the ground terminal of the PCB 39 arranged on the rear side of the main frame 41 by a screw.

The coupling hole of the ground connection plate 43 is elliptically shaped and is configured to have a connection margin when coupling the ground terminal of the PCB 39 by a screw. Because the ground connection plate 43 is coupled with the single ground terminal of the PCB 39 arranged on the rear side of the main frame 41, only the single coupling hole is formed. Also, although not shown in the drawing, when the ground connection plate 43 is coupled with the connection plate coupling part 47 of the main frame 41, the case ground part (not shown) formed at the edge of the ground connection plate 43 contacts the top case to ground the ground terminal of the PCB.

The ground terminals of the PCBs that are folded and arranged to the rear side of the main frame are grounded to the top case by coupling the ground connection plate with an edge of the main frame thus, resulting in a thinner LCD by coupling only the top case with the main frame.

As described above, the present invention allows the ground terminals of the PCBs for an LCD panel to be connected with the top case, thereby stably grounding the PCBs without attaching a separate ground plate to the main frame.

In addition, according to the present invention, because the main frame accommodating the LCD panel does not need a separate cover plate for grounding the PCBs, the resulting LCD may be lighter and thinner.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An LCD mold frame assembly comprising:

a main frame a plurality of connection plate coupling parts corresponding to PCBs attached to the rear side of the main frame, wherein the connection plate coupling parts are integral to the main frame along edges of the main frame; and a plurality of ground connection plates coupled to the plurality of connection plate coupling parts, for grounding ground terminals of the PCBs to an upper case.

2. The mold frame assembly according to claim 1, wherein the ground connection plate includes a coupling hole formed thereon and to which a screw is coupled.

3. The mold frame assembly according to claim 2, wherein the coupling hole of the ground connection plate is elongated.

4. The mold frame assembly according to claim 1, further comprising:

a display panel;

a panel guide coupled with the main frame;

a top case coupled with the main frame so as to protect the display panel; and a backlight unit;

wherein a display panel and a backlight unit are stacked on the main frame.

5. The mold frame assembly according to claim 4, wherein the ground connection plate has a case ground portion formed at an edge thereof and is grounded to the top case.

6. The mold frame assembly according to claim 1, wherein the ground connection plate has two coupling holes, one having a circular shape and the other having a groove shape with an open portion on one side.

7. The mold frame assembly according to claim 1, wherein the ground connection plate has a latch jaw.

8. The mold frame assembly according to claim 1, wherein the connection plate coupling part has at least one coupling groove.

9. The mold frame assembly according to claim 1 wherein the PCBs have ground terminals that are grounded to the ground connection plate by a screw.

10. The mold frame assembly according to claim 9, wherein the ground terminals of the PCBs, the ground connection plates, and the top case are electrically connected by a screw.

11. The mold frame assembly according to claim 1, wherein the ground connection plate has connection plate coupling part coupled to the top case.

12. An LCD display comprising:

a display panel;

a mold frame assembly comprising:

a main frame a plurality of connection plate coupling parts corresponding to PCBs attached to the rear side of the main frame, wherein the connection plate coupling parts are integral to the main frame along edges of the main frame; and a plurality of ground connection plates coupled to the plurality of connection plate coupling parts, for grounding ground terminals of the PCBs to an upper case;

a backlight unit stacked with the display panel in the main frame;

a panel guide frame coupled with the main frame; and a top case coupled with the main frame.

13. The LCD display according to claim 12, wherein the ground connection plate includes a coupling hole formed thereon and to which a screw is coupled.

14. The LCD display according to claim 13, wherein the coupling hole of the ground connection plate is elongated.

15. The LCD display according to claim 13, wherein the ground connection plate has a case ground portion formed at an edge thereof and is grounded to the top case.

16. The LCD display according to claim 12, wherein the ground connection plate has two coupling holes, one having a circular shape and the other having a groove shape with an open portion on one side.

17. The LCD display according to claim 12, wherein the ground connection plate has a latch jaw.

18. The LCD display according to claim 12, wherein the connection plate coupling part has at least one coupling groove.

19. The LCD display according to claim 12, wherein the PCBs have ground terminals that are grounded to the ground connection plate by a screw.

20. The mold frame assembly according to claim 19, wherein the ground terminals of the PCBs, the ground connection plates, and the top case are electrically connected by a screw.

21. The mold frame assembly according to claim 12, wherein the ground connection plate has connection plate coupling part coupled to the top case.

* * * * *